United States Patent
Lu et al.

(10) Patent No.: US 7,974,971 B2
(45) Date of Patent: *Jul. 5, 2011

(54) QUERY IDENTIFICATION AND NORMALIZATION FOR WEB SEARCH

(75) Inventors: Yumao Lu, San Jose, CA (US); Nawaaz Ahmed, San Francisco, CA (US); Fuchun Peng, Sunnyvale, CA (US); Marco Zagha, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,036

(22) Filed: Jun. 17, 2010

(65) Prior Publication Data

US 2010/0257150 A1    Oct. 7, 2010

Related U.S. Application Data

(63) Continuation of application No. 12/015,448, filed on Jan. 16, 2008, now Pat. No. 7,769,746.

(51) Int. Cl.
G06F 17/30 (2006.01)
(52) U.S. Cl. ...................................................... 707/713
(58) Field of Classification Search .......... 707/600–603, 707/705–708, 713, 723
See application file for complete search history.

(56) References Cited

U.S. PATENT DOCUMENTS
7,571,177 B2 * 8/2009 Damle ................... 707/999.102

OTHER PUBLICATIONS

Peng et al, "Context Sensitive Stemming for Web Search", 2007, ACM, 8 pages.*
Hidetsugu Nanba, "Query Expansion using an Automatically Constructed Thesaurus", 2007, Hiroshima City University, p. 414-419.*
Ali Shiri "Query Expansion Behavior within a Thesaurus Enhanced Search Environment: A User Centered Evaluation",2006, Wiley InterScience, 17 pages.*

* cited by examiner

*Primary Examiner* — Cam-Linh Nguyen
(74) *Attorney, Agent, or Firm* — Martine Penilla & Gencarella, LLP (57) ABSTRACT

A computer-implemented method for processing user entered query data to improve results of a search of pages using a local search database, when searching the internet, is disclosed. The method includes receiving the user entered query data and parsing each word of the query data and segmenting words using a probabilistic dictionary to determine a likelihood that the word is for a particular name. And, associating the particular names with a name tag to create one or more tagged name terms. Then, normalizing each of the tagged name terms and the normalizing including boosting information if found in the local search database and determining proximity between selected ones of the tagged name terms. The method then generates an optimized search query that incorporates normalized terms and operators. The optimized search query being applied to the internet to enable search results to be produced and displayed to the user in response to the entered query data.

20 Claims, 7 Drawing Sheets

QUERY IDENTIFICATION AND NORMALIZATION FOR WEB SEARCH

CLAIM OF PRIORITY

This application is a Continuation Application under 35 USC §120 and claims priority from U.S. application Ser. No. 12/015,448 entitled "LOCAL QUERY IDENTIFICATION AND NORMALIZATION FOR WEB SEARCH.", and filed Jan. 16, 2008 now U.S. Pat. No. 7,769,746, and is herein incorporated by reference.

BACKGROUND

1. Field of the Invention

The present invention relates to methods for improving internet search results, and more particularly, methods and systems for processing entered search queries to construct a query that optimizes the relevance of the obtained results.

2. Description of the Related Art

The computing industry has seen many advances in recent years, and such advances have produced a multitude of products and services. Internet websites are examples of products and services, which are created to give users access to particular types of services, data, or searching capabilities. Online content providers are increasingly moving towards building World Wide Web sites which are more reliant on dynamic, frequently-updated content. Content continues to be made available more and more via online auction sites, stock market information sites, news and weather sites, or any other such site whose information changes on a frequent basis, oftentimes daily.

Typically, major search engines, which enable Internet users to search for information on the World Wide Web, create search databases of information which rely on pages being static instead of dynamic. To create these databases, the search engine does what is known as "crawling" web sites by retrieving the content of a given Web page and storing it for later use. These databases are extensive, and can be updated frequently by crawls to capture changes.

Once such database, is a local business database that is maintained by Yahoo!, Inc. The local business database holds information obtained from websites and other resources, to define various data that may be useful to interested users. To initiate a search of the local business database, users are provided with special search text boxes, where terms must be specifically entered into selected boxes. Depending on what the users enter, the search engine provides the best possible results and some ranking. However, users don't always know to use the special search text boxes, and end up using the general search box of a search engine. As a result, the search engine needs to do more analysis of the search terms, to quickly provide the search results. If a user intended to search for a particular business in some local area, the general search engine may not look to other databases.

Thus, although other databases holding local business information are maintained for other specialized search queries, these databases are not accessed when a search is done through the general search text box. Consequently, searches for local information, e.g., businesses, which are commonly entered in a non-structured manner, do not generally return quality results. Additionally, even if the search terms are entered in a structured manner, into the general search text box, the results still lack quality, as no processing is done on the query terms before the search is executed. Thus, the quality of web search results for local queries is not satisfying.

It is in this context that embodiments of the invention arise.

SUMMARY

Embodiments of the present invention provide methods and computer implemented systems that enable analysis of user entered queries into a search engine and processing a structured query that improves the user entered information and adds modifiers, constraints and logic to the query, which enables the query to return more accurate results to the user.

It should be appreciated that the present invention can be implemented in numerous ways, such as a process, an apparatus, a system, a device or a method on a computer readable medium. Several inventive embodiments of the present invention are described below.

In one embodiment, a computer-implemented method for processing user entered query data to improve results of a search of pages using a local search database, when searching the internet, is disclosed. The method includes receiving the user entered query data and parsing each word of the query data and segmenting words using a probabilistic dictionary to determine a likelihood that the word is for a particular name. And, associating the particular names with a name tag to create one or more tagged name terms. Then, normalizing each of the tagged name terms and the normalizing including boosting information if found in the local search database and determining proximity between selected ones of the tagged name terms. The method then generates an optimized search query that incorporates normalized terms and operators. The optimized search query being applied to the internet to enable search results to be produced and displayed to the user in response to the entered query data.

In another embodiment, a system for processing user queries provided to a search engine. The system includes (a) a user interface for receiving user queries; (b) a search server in communication with the user interface, the search server including, (i) processing of probability logic that generates probability dictionaries, the probability logic using a Hidden Markov Model, which is trained with name databases; and (ii) processing to implement a term parser, a tag applicator, and a term normalizer, the term parser and the tag applicator being in communication with the probability logic, so as to enable segmentation of the user queries and tagging of the user queries and the term normalizer being in communication with a database, the database being accessed by the term normalizer to canonicalize and boost terms found in the database and analyze proximity between terms of the user query, wherein an optimized search query is constructed and applied to the internet, the optimized search query returning search results to the user interface.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and computer implemented systems that enable analysis of user entered queries into a search engine and processing a structured query that improves the user entered information and adds modifiers, constraints and logic to the query, which enables the query to return more accurate results to the user.

In one embodiment, the user query may include information, such as business names and location. Although emphasis is made on one embodiment, where the focus is business names and locations, the focus can be expanded to other intents and terms, which also benefit from the processing described herein. For instance, instead of just focusing on business names, it is also possible to focus on other names, such as schools, parks, historic sites, events (e.g., "sunnyvale race for the cure"), business categories (e.g., "plumbers"), etc. Other examples are provided below. In the example of local businesses, the business names can be entered in any format and the location information can also be entered in any format. If the query contains business name information and location information, processing is performed on the user entered terms. Initially, business names need to be segmented, and the proximity of the component terms in documents to be considered in selecting and scoring documents. For example, for query "village green apts of rochester mi", the search engine needs to know that "village green apartments" is a business, and match the phrase instead of word by word.

Then, the business name in user queries is canonicalized. For example, a user usually input "apts" for "apartments", "univ" for "university", etc. In the canonicalization, these terms are converted into a standard form, such as the more formal complete spelling. The location, if provided, also needs to be segmented and normalized to match the location information to a document, instead of word by word matching. For example, query "farm bureau insurance of nc" has a state name "nc," while the search engine should match "North Carolina" in a document. In summary, queries are processed, and if the queries have information related to businesses and locations, then the queries are processed as "local queries", which enables leveraging of information collected about businesses and locations, to boost the relevance of search results and increase user satisfaction.

The processing is therefore designed to segment and normalize the user entered queries, process the normalized information to create constraints, rules and proximity rules, which are structured into an optimized query. The optimized query, in turn, is used to search the Internet and return results, with better search relevance.

In one embodiment, local queries identification and segmentation is aided by using a Hidden Markov Model (HMM).

A HMM model is trained using a complete U.S. business name list, a complete U.S. city-state list, and top 25 million popular queries.

Some current relevance evaluations have shown that the resulting optimized search query improves in better identifying and satisfying user intent. Such tests have shown that relevance is significantly improved in terms of DCG (Discounted Cumulative Gain) and other relevance metrics. DCG is a widely used search quality metric. For more information on metric analysis and other methods for determining the effectiveness of search processing, reference may be made to a paper by Fuchun Peng et al., entitled "Context Sensitive Stemming for Web Search", which is incorporated herein by reference.

With the above overview in mind, the following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings. Reference is now drawn to the Figures, which provide additional details regarding the functional operations performed to define an optimized query from a user entered query.

Figure 1:
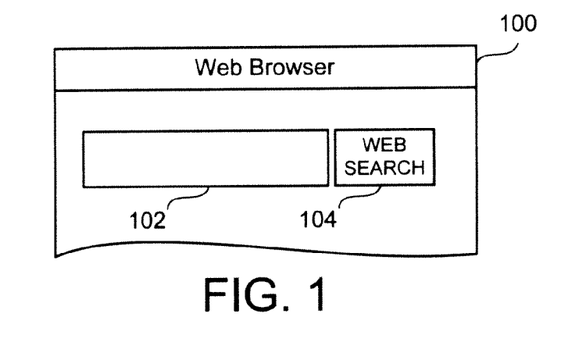
FIGS. 1 and 2 illustrate a web browser and freely entered user queries, in accordance with one embodiment.

FIG. 1 illustrates a web browser 100 having a search box 102 and a web search button 104. As is common, users will launch a web browser 100 when they desire to search the internet for particular subjects of interest. A benefit of a web browser having a search box 102 is that users can freely enter any search term(s) into the search box 102, and then hit the search button 104. The search engine will generate results, which are then returned to the user's web browser 100 and displayed. Commonly, the results are shown to the user on a computer display in an ordered format, preferably showing them in an order of priority in regards to their relevance to the search terms.

Figure 2:
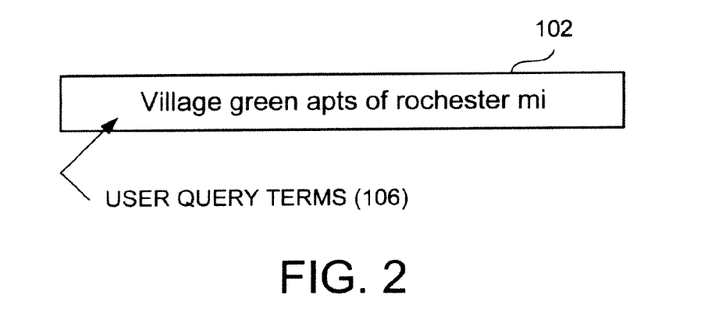

As noted above, users are freely able to enter any words, teens or phrases into the search box 102, to define their user query teens 106, as shown in FIG. 2. The example of FIG. 2 shows a user entering the user query terms 106 as "village green apts of rochester mi." Because users can enter any word, phrase or terms, the user query will not always contain information sufficient to qualify it as one having the intent to find a business at some location. If the terms do not have anything to do with businesses or locations, then the local business processing will not be performed on the user entered terms. In one embodiment, an important aspect is recognizing a query's business and location entities to recognize a user's local intent (this is very different from general query entity segmentation). Thus, when a user's local intent is recognized, it makes sense to call a Local Business Database to process queries.

Figure 3:
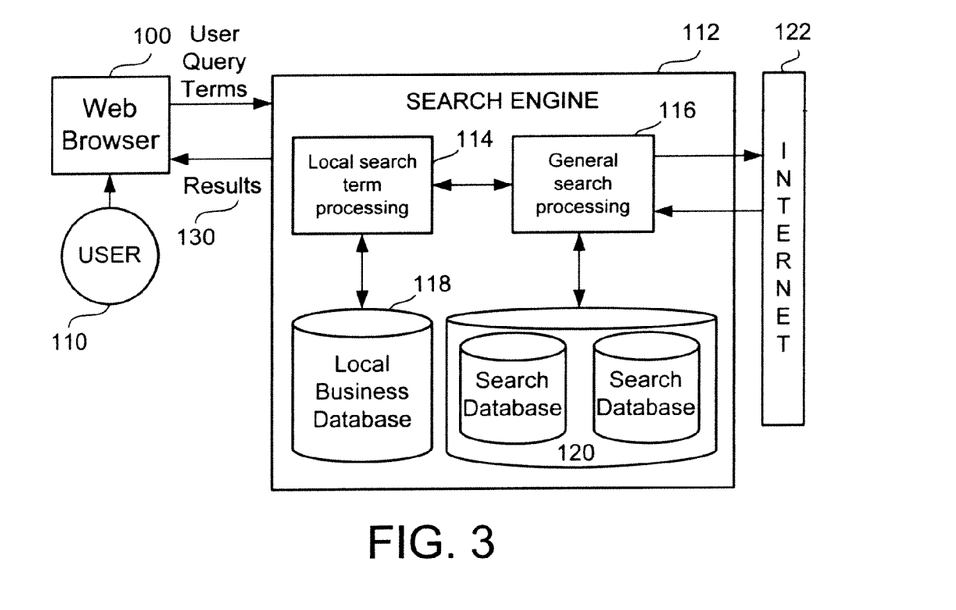
FIGS. 3 and 4 illustrate system interfacing and functional components that enable the processing of user queries to define optimized queries, in accordance with one embodiment.

FIG. 3 illustrates one embodiment of the present invention which includes a search engine 112, that performs additional processing to improve the quality of search results, when users freely enter user query terms 106, in any format.

In a specific example, the user 110 will enter user query terms into the browser 100. The browser 100 will then communicate with a search engine 112. The search engine 112 in turn, communicates with a database of internet content 122, to thus provide results to the user 110 through the web browser 100. The results 130 are then displayed in the user's display for further selection, clicking on links, and refinements, as desired. The search engine 112, in this embodiment, includes a local search term processing module 114. The local search term processing module 114 is designed to pre-process the user query terms 106 in a particular format so as to improve the quality of the search terms that are then processed by the general search processing 116 of the search engine 112.

The processing performed by the local search term processing 114 is designed to generate an optimized query that is then passed to the general search processing 116, which processes the contents of the internet 122, and then provides a list of web pages back to the user 110, through the web browser 100. In this embodiment, the local search term processing 114 is in communication with a local business database 118. The local business database 118 is designed to include comprehensive data regarding businesses, their relevance to specific terms, and their associated addresses (e.g., cities and states). The local addresses will also include street names and numbers that may be associated with the address of a local business. The local business database 118 is continually updated offline to obtain updates regarding businesses, their locations, their addresses, their specialties, and other information. The local business database 118 may also include indexes of web pages, links, cache of pages, etc.

Thus, the local search term processing 114 is designed to interface with the local business database 118, to obtain information that will allow the search engine 112 to optimize and normalize the search terms. The result is an optimized search query, that is applied for an internet 122 search. The search results, when returned back to the user 110, are displayed on the web browser 100. Also shown as part of or associated with the search engine 112, are search databases 122. Search databases include comprehensive indexing, caches of pages, and other information that allows the search engine 112 and the general search processing 116 to optimally access and retrieve pages and information related to particular search terms, when accessing the internet 122.

Figure 4:
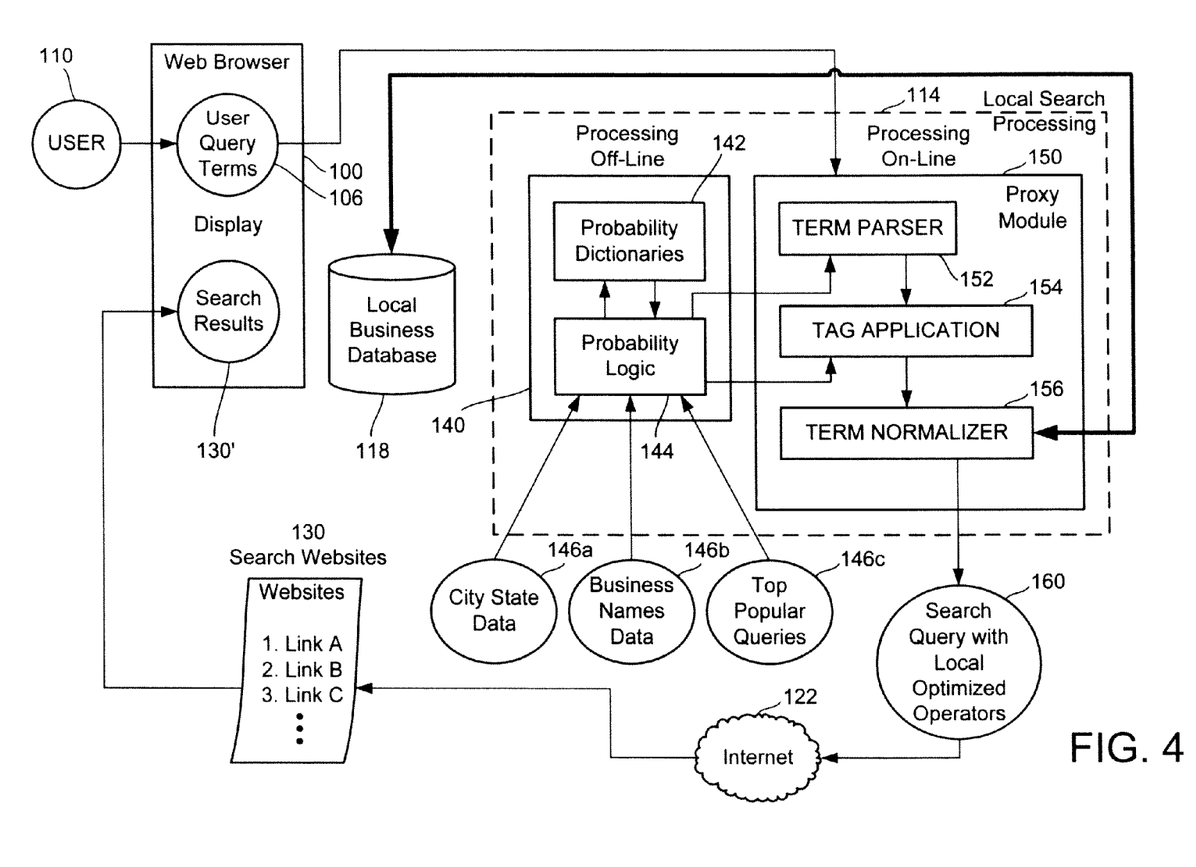

FIG. 4 illustrates a more detailed diagram of the local search processing 114 of FIG. 3, in accordance with one embodiment of the present invention. The user 110 accesses the web browser 100 to define the user query terms 106. The user query terms are displayed and entered through a display, such as a monitor on a computer, laptop, or handheld device. The user query terms are then provided to the local search processing 114 where online processing is performed in a proxy module 150. The online processing is performed on demand in response to a user query term provided through the web browser 106. The proxy module 150 generally includes a term parser 152, a tag application 154, and a term normalizer 156.

These functional blocks of the proxy module 150 are designed to process the query terms 106 so as to generate a search query that has been augmented with information obtained from a local business database to optimize the searching performed on a database of the internet 122. The optimized search query 160 is then shown interfacing to the internet 122 (database), which then provides search results 130 in the form of websites. The websites shown in search results 130 may include various links, such as link A, link B, link C, etc., which can be represented as various websites, URLs, and the like. The local search processing 114 also includes an offline processing module 140, which is designed to optimize information that is used by tag application 154 and term parser 152, to allow local query identification and segmentation, in accordance with one embodiment of the present invention.

The probability logic 144 creates probability dictionaries 142, in the form of matrices. The probability logic 144, in one embodiment, uses a Hidden Markov Model (HMM), which is designed to be trained by the information that is provided to the probability logic 144. Hidden Markov models are well known models that are widely used in gene analysis, speech analysis and text analysis. For more information on HMMs and their applications, reference can be made to a paper by L. R. Rabiner, *A Tutorial on Hidden Markov Models and Selected Applications in Speech Recognition*, Proceedings of the IEEE, vol. 77, no. 2, 1989, which is hereby incorporated by reference.

In one embodiment, the HMM is trained by providing a comprehensive list of cities and state data 146a, business names data 146b, and top popular queries 146c. In one embodiment, the top popular queries 146c may include the top 25 million popular queries or some other number. The HMM model thus achieves a far better precision and recall than the heuristic rule-based methods implemented in other algorithms. In one embodiment, the training enables labeling of terms/entities that are not in standard dictionaries.

The proxy module 150 therefore includes the term parser 152 that works in conjunction with the tag application 154, and the input from the probability logic 144 that is processed offline. The parsing performed by term parser 152 also takes advantage of the information provided by the HMM, that is performed by the probability logic 144. The term parser 152 and the tag application 154 will then generate a list of tag information, as shown in FIG. 5A.

Figure 5A:
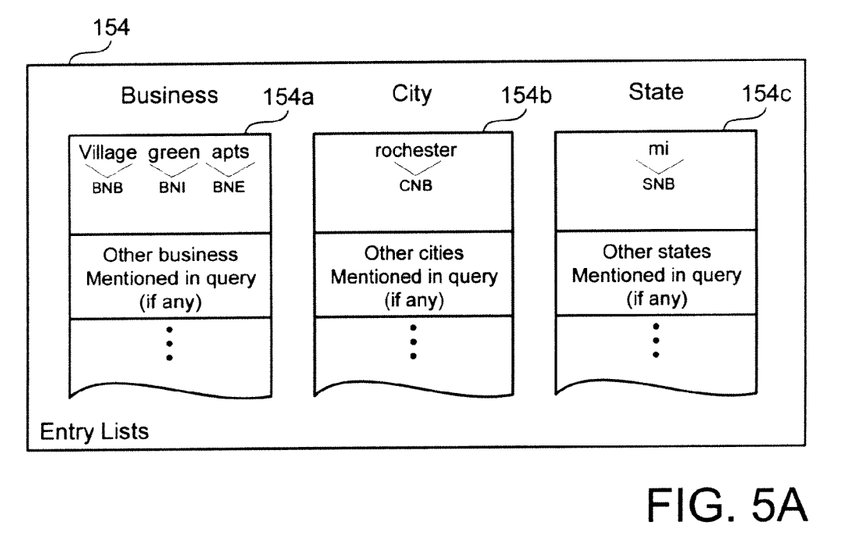
FIGS. 5A and 5B illustrate examples of segmented terms and tags used in the identification of specific search query terms, in accordance with one embodiment.

The illustration of FIG. 5A shows the result of processing the user query terms 106 to define a plurality of tag terms that are then also arranged (segmented) in particular orders based on whether they may be business related, city related, or state related. The HMM processing performed by the probability logic 144 will allow the term parser and the tag application to work synchronously to best identify the particular words that were entered as part of the user query temis 106 and then identified and segmented into the proper categories.

The proper categories are shown as a business list 154a, a city list 154b, and a state list 154c. In this example, the first user query terms 106 that were provided as an example in FIG. 2 are shown as the first entry in each of the lists 154a, 154b, and 154c. In longer user queries, it is possible to find more than one business name and more than one location. Thus, if other business names, or other cities or other states are found in a query, it is possible for the lists 154a, 154b, and 154c to have additional identified businesses, cities and states. For ease of understanding, it would be assumed that a single business, a single city, and a single state were identified. Each term in the business list, the city list, and the state list will be tagged. The tagging is performed by tag application 154 to assign an order to the terms that were found after the segmentation and ordering by HMM of the probability logic 144. In one embodiment, if only a business name is found, or only a location is found, then the local intent of the user is not quite clear, and thus the local business database will not be accessed.

Figure 5B:
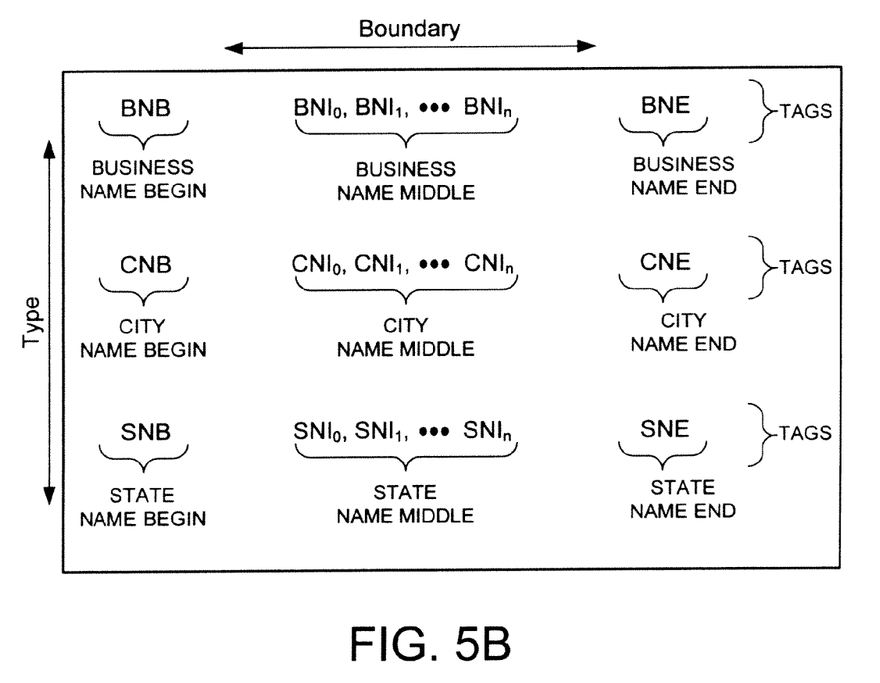

FIG. 5B illustrates an example of the tagging logic and assignments performed, depending on whether the terms are categorized and segmented to be business related, city related, or state related. Thus, the boundary segmentation is shown in the X direction, while the type is shown in the Y direction.

The first type is the business type and the first term will be identified by tag BNB, the business name middle tags will be identified as BNI through BNIn, depending on the number of terms that will exist between the beginning tag BNB and an end tag BNE. The same applies to the city tagging and state tagging conventions.

Accordingly, referring back to FIG. 5A, the query term village green apts will be assigned BMB for the first term (village), because it is likely to be the first term in the business name, based on the HMM processing, the teen green would be identified as BNI, and the term apts would be identified BNE (as the last term in the business). If the term village green apts were a longer list of terms, it is possible to have listed more BNIs between the BNB and the BNE. The example for city shows a single tag CNB and the state, a single tag for SNB. Accordingly, the processing performed by the probability logic 144 and its interface to the proxy module 150 through its communication to term parser 152 and tag application 144, will define segmented lists. The lists separate the search terms in business lists, city lists, and state lists, each with an associated tag in their associated segmentation.

Once the segmentation has occurred and the terms have been tagged in their appropriate entry lists 154a, 154b, and 154c, each of the terms in the list will be processed one after another in the order commencing with the business list 154a, the city list 154b, and then the state list 154c. In another processing operation, the combined city and state list will be processed as will be described below with reference to FIG. 6 through 8.

Figure 6:
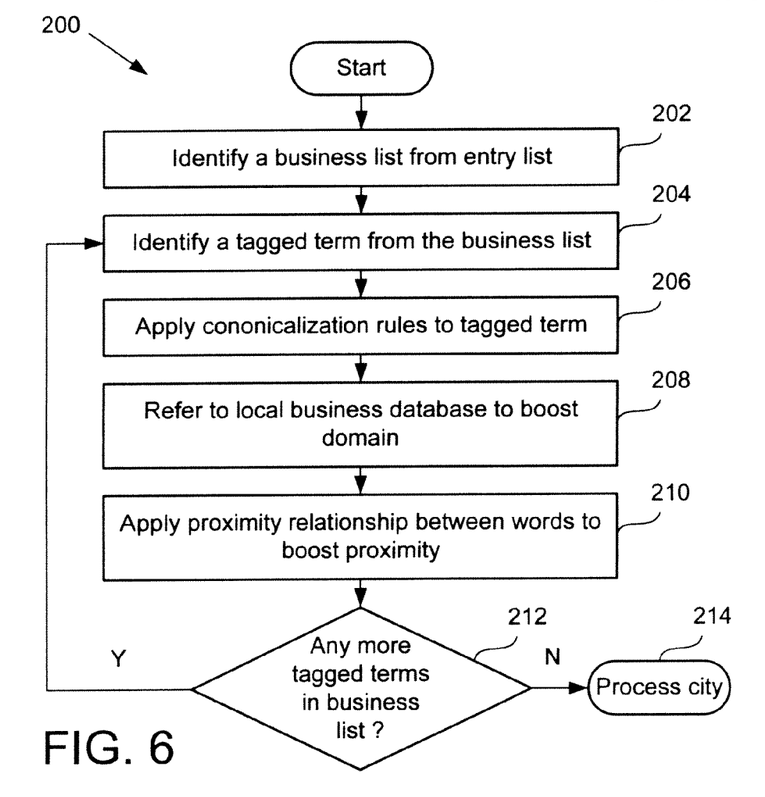
FIGS. 6-8 illustrate flow charts, defining processing operations used to segment, normalize and construct parameters for the definition of the optimized search query, for local business intents, in accordance with one embodiment.

FIG. 6 is a flowchart 200 illustrating the processing that is performed on the tag terms in the business list 154a, one term at a time. The method begins in operation 202 where a business list from an entry list is identified. The entry list is shown in FIG. 5A, and the business list is 154a. In operation 204, a tag term from the business list is identified. The first tag term would be BNB, and as such, would be identified as "village". The process moves to operation 206 where a canonicalization in operation 206 is performed. The canonicalization of the tag term is performed to apply rules to standardize the term.

In one embodiment, the process of canonicalization in computer science is a process of converting data that has more than one possible representation into a standard canonical representation. The process can include the comparison of different representations or equivalents to count the number of distinct data structures to improve the efficiency of various algorithms, by eliminating repeated calculations, or to make it possible to impose meaningful sorting orders. Additionally, the process applying canonicalization rules includes the converting of particular short term abbreviations into the complete standard term or word.

For instance, the abbreviation for California may be in the faun of "ca", or "Calif", or "Cal" or "Cali" or other representations. The canonicalization of these terms will then replace the terms with a standard format so that meaningful operations can be done when comparisons are made or search terms are constructed. Thus, all the abbreviations or terms or short terms for the word California would then be standardized into "California" or another standard, such as "CA". What is "standard," can be preset. In general, canonicalization applies rules when certain tagged terms are encountered so as to determine if those tag terms are in standard format, and if they are not in a standard format, they are then converted into a standard format.

Figure 9:
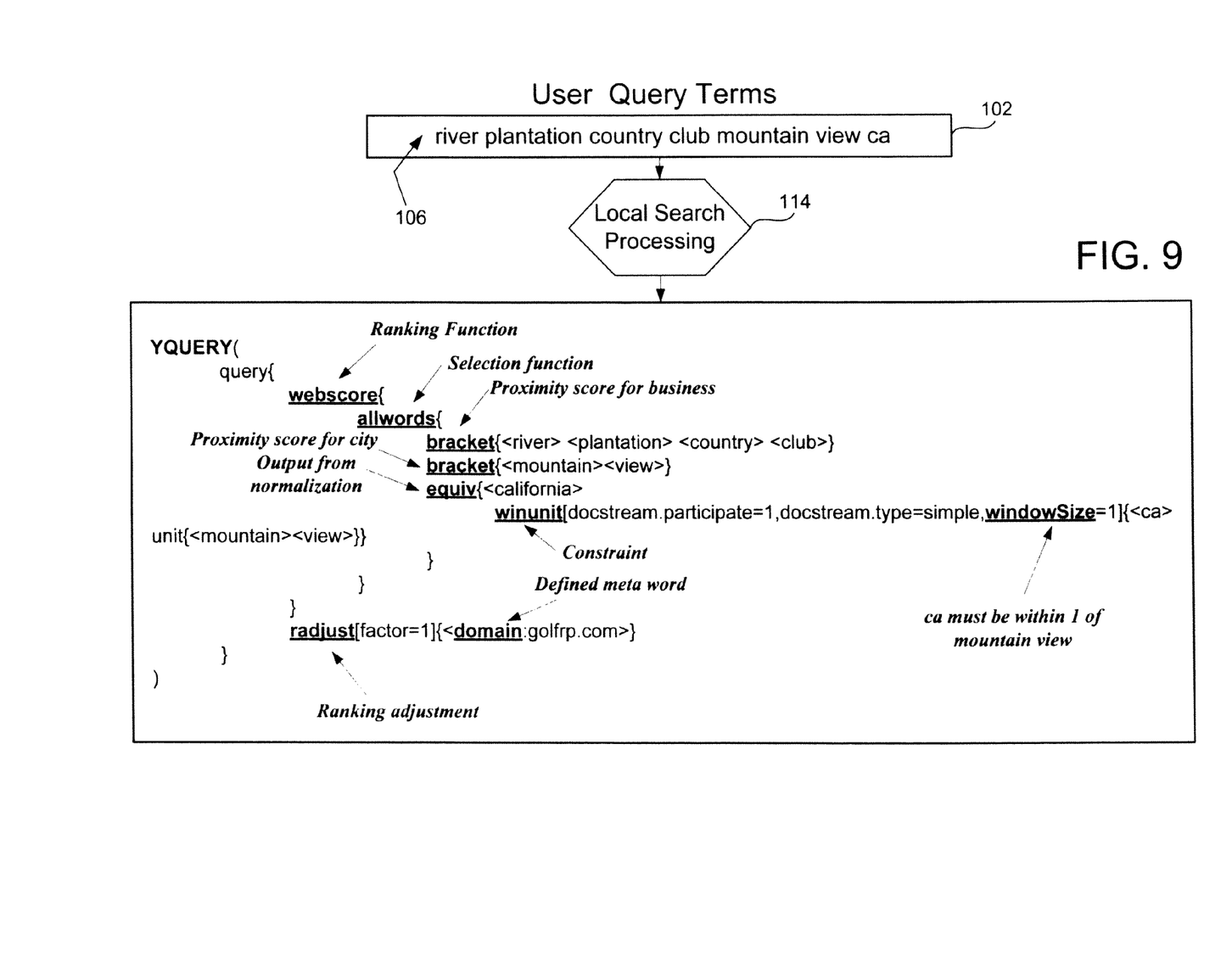
FIG. 9 illustrates an example optimized query, after processing of a user entered query, having elements that enable more efficient and optimum searching of the internet, when queries are intended for local business concerns, in accordance with one embodiment.

In operation 208, the local business database is referenced to determine if a tagged, canonicalized business term identified in the search query is associated with one or more preferred internet domain names. Such domain names, if found, are saved so as to apply the information to the building of the optimized search query 160 (e.g., as shown in FIG. 4 and FIG. 9), in order to prefer documents from those domains when ranking search results.

In operation 210, proximity relationships between words are examined so as to determine if certain words are in close relationship between other words and if sufficient proximity exists between such words, a proximity boost is applied to the various terms that are tagged and examined in operation 210. In operation 212, it is determined if there are any more tagged terms in the business list 154a. If there are, the method moves to operation 204, and proceeds through 206, 208 and 210 until all of the tagged terms in the list are processed. In this example, there are three terms that are processed (village, green, apts). For reference, the word apts is a tagged term that would be processed through operations 204 through 210, and when processing by the canonicalization 206, the word apts would then be converted into a standard form, such as "apartments".

As the process proceeds through the business terms that were tagged, search of the terms is updated so that the terms that result and remain for further processing in later operations are the processed canonicalized terms.

Figure 7:
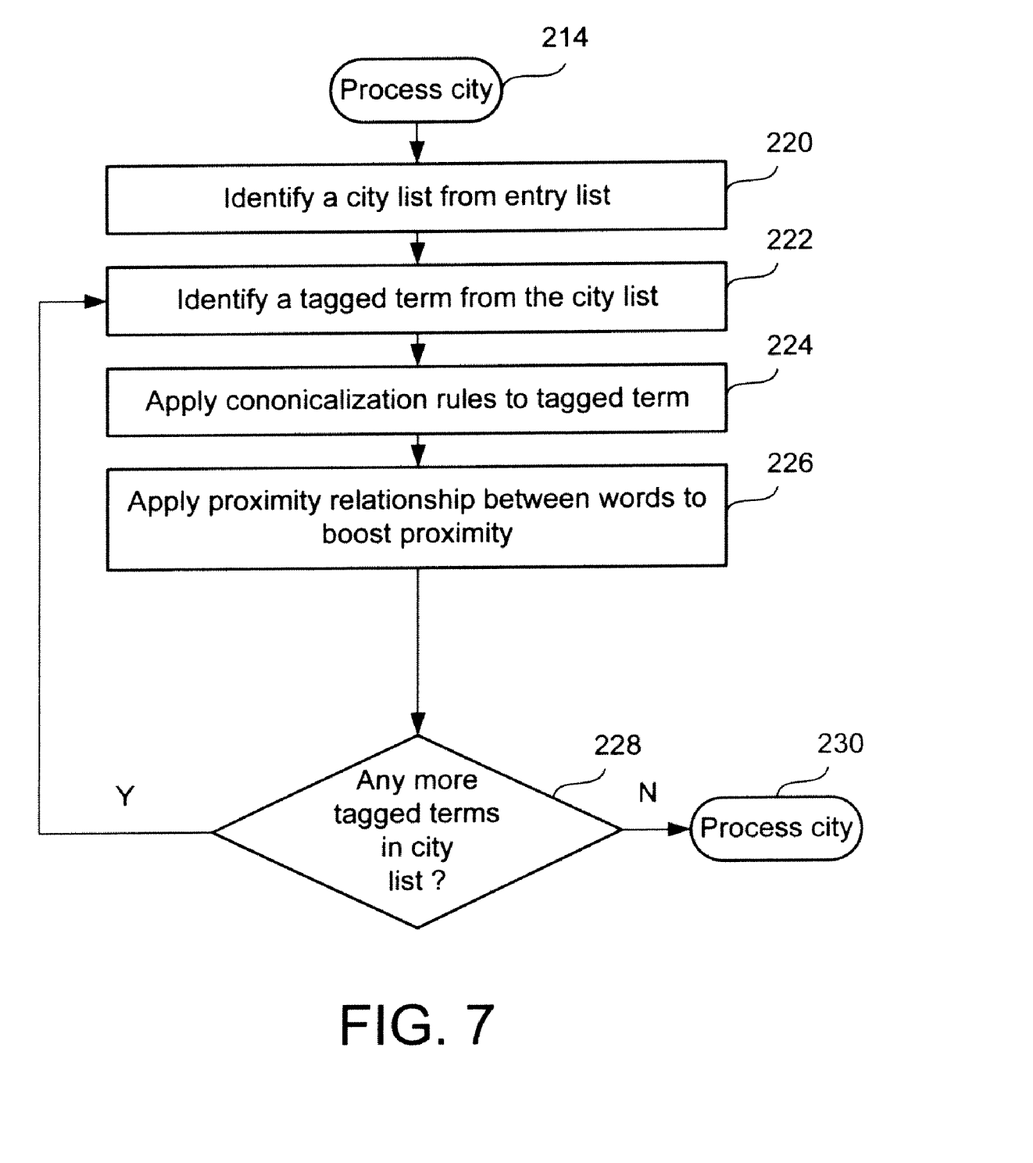

The method then moves to operation 214, where the city will be processed. FIG. 7 illustrates processing of city 214 associated with the city list 154b of FIG. 5A. The method begins at operation 220 where a city list from the entity list is identified. The city list is city list 154b. Operation 222 includes identification of tag terms from the city list. The only tag term in this city list is rochester and it is identified by tag CNC. Operation 224 includes a canonicalization application of rules to the tag term. The tag term is rochester, and, the canonicalization of rochester would be to simply stay as rochester. To provide other examples where the city changes after the canonicalization, the terms "mt alto" could be changed to "mount alto"; "e palo alto" could be changed to "east palo alto", and so on.

Operation 226 applies proximity relationships between words to boost the proximity rating for the words. As there is only a single word in the city, there is no proximity relationship operation 226. However, if a multi-word city was present in the list, then the relationship between the words would be analyzed to determine and apply a boost to the proximity associated with those words.

In operation 228, it is determined if there are any more tagged terms in the city list. If there are, the method moves back to operation 222 and proceeds through operation 224, 226, then again, so long as there are more terms. If there are no more terms, the methods moves to operation 230 where the state is processed.

Figure 8:
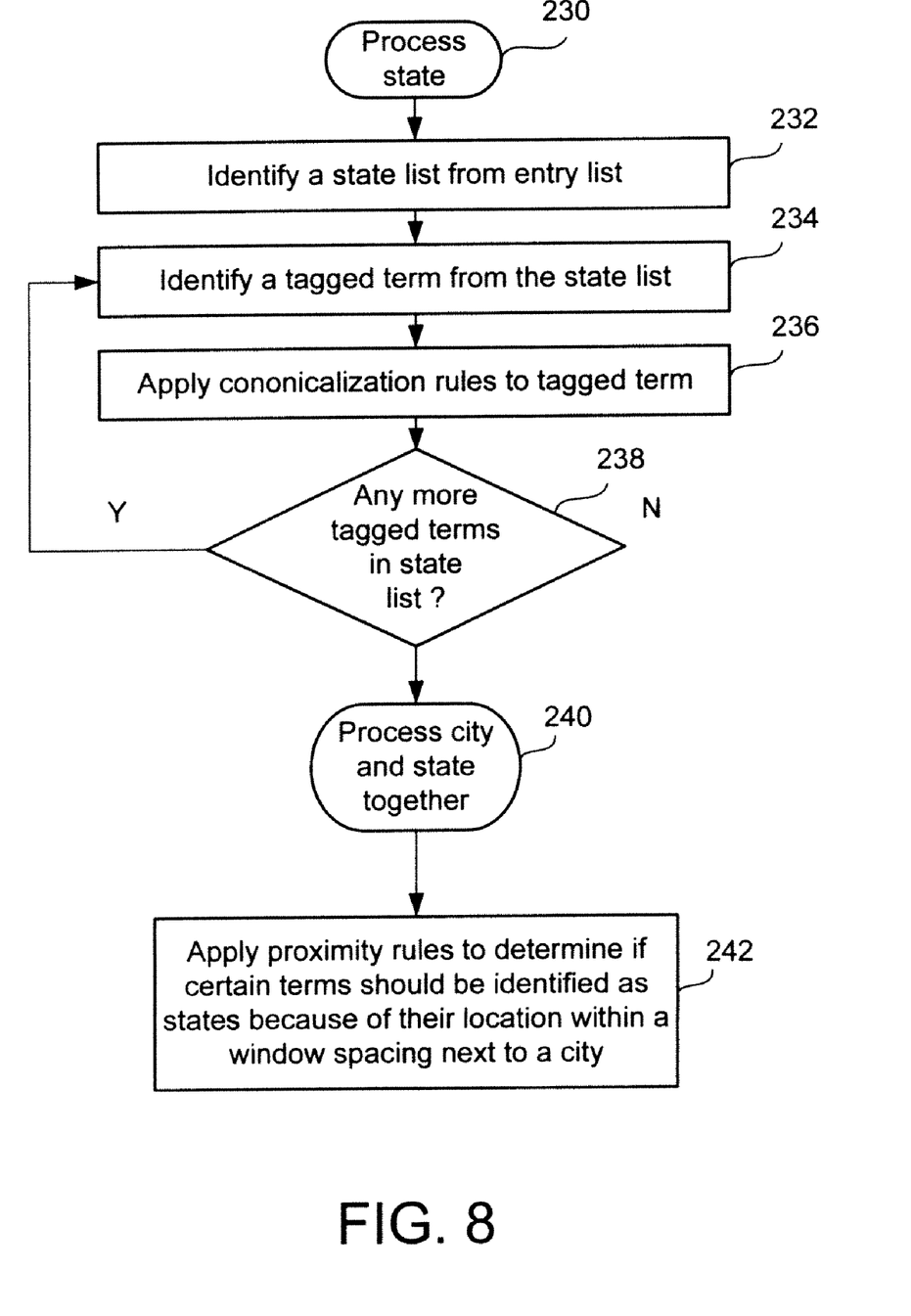

FIG. 8 illustrates the state processing 230 which begins at operation 232. In operation 232, a state list from the entry list is identified. The tag term in the state list is then identified in operation 234. In this example, the tag state term mi is tagged as SNB in list 154c of FIG. 5A.

In the next operation in 236, the canonicalization rules are applied to the tagged term to then generate a standardized term for the detected tagged state. In this example, "mi" would then be converted into "Michigan". The method will then move to operation 238 where it is determined if other state terms are found in the list, and if not, the method moves to operation 240, where the city and state are processed together. This processing occurs in operation 242. Up to this point, each of the tagged terms in the business, the city, and the state have been processed to be canonicalized, and boosted as appropriate. However, there are situations where certain state terms have not yet been canonicalized because they were not identified to be a state due to their placement relative to other words.

In one example, if a query term "ca" is found near a query term Sunnyvale, which is a city name that has been canonicalized into "sunnyvale", the method will treat "California" as an equivalent of "ca", where "California" appears in a document near the term "sunnyvale." Stated another way, the terms for business, the terms for city, and the terms for state have been individually processed through operations described with reference to FIGS. 6, 7 and 8. At this point, the method in operation 242 will take the processed city and state information to determine if there are any other terms that may have been omitted from being properly processed and canonicalized, such as the term "ca" if it were placed next to the word "sunnyvale". If "California" is found in a document, but it is not within the allowed window spacing of "sunnyvale", then that occurrence of "California" will be ignored. In other words, an abbreviated state name in a user query will match the canonical expanded state name only when the expanded state name appears in documents sufficiently close to the city that is specified in the user query.

During the processing operations that are performed in FIGS. 6, 7 and 8, the proximity of the business name is boosted, the business name is canonicalized, the proximity of multi-word city names are boosted, the city or state name is canonicalized, and the preferred domains are boosted. All of this information is used to create and form a query that is optimized, with search terms and constraints that enable for more relevant searches to be performed over the internet. It should be noted that the optimized search for canonical terms can allow abbreviations and other non-canonical forms to be treated as equivalent forms, e.g., a user query for "sunnyvale california" may result in a query execution that treats "ca" as equivalent to "california" where "ca" appears in documents near "sunnyvale". It should be noted that the terms that can be found can include more than just city and state. For instance, the processing can also be done on zip codes, counties, regions, informal regions ("sf bay"), country, and relative locations ("in central park", "near moscone convention center"), etc. Addresses in web pages can be recognized and augmented with alternate representations such as latitude and longitude. City names can be used to match zip codes or phone area codes.

FIG. 9 illustrates the example where the initial user query terms "river plantation country club mountain view ca" are shown in the search box 102. The user query terms are processed by the local search processing 114, which include the processing performed by the offline processing 140 of FIG. 4, and the online processing performed by the proxy module 150 of FIG. 4. This processing of the terms will thus provide a structured segmentation of the terms into their proper categories, and then each of the terms are processed to further normalize the terms in operation 156 of FIG. 4. The term normalizer 156 will therefore be accessing the local business database 118 to determine the appropriate boosting to the search terms and thus, information that will be embedded in the search query that is generated in 160 of FIG. 4.

The search query with local optimized operators is thus generated by the local search processing 114 of FIG. 9. FIG. 9 also illustrates an example optimized query, identified for ease of reference, as "YQUERY". As noted, the YQUERY is constructed from the local search processing 114, in response to the user query terms 106. As shown, various operators are constructed for the YQUERY, including a ranking function, selection function, proximity scores for businesses, proximity scores for cities, outputs from normalization, constraints, ranking adjustments, term equivalences, and other modifiers such as defined meta words, and constraints to define window sizes.

As mentioned with reference to operation 242, a window spacing location is set to determine when the city and state are next to each other, and the constraint winunit of FIG. 9 shows the term window size equals 1. This means that ca must be within 1 word position of mountain view in a document in order to be considered equivalent to the word california. The resulting formulation and construction of the YQUERY is to allow the query construction to occur by boosting the terms provided by the user query terms and applying rules that will enable an optimized query to be constructed, which will provide the most relevant information to the user. Thus, users are not required to input strict constructed search terms into separate search boxes.

These modifiers and content features of the YQUERY are only examples, and more or less modifiers, functions and constraints may be added, depending on the entered user query and data obtained from the local business database and off-line processing. Thus, as the content of the local business database changes or the training of the HMM changes, the resulting YQUERY will also change. However, the functional operations will remain the same, namely that a user query is identified, segmented, normalized, and then reconstructed into an optimized query. In the examples provided herein, the normalizing operations take advantage of the available content in the local business database, however, other specialized databases can also be used, in cases where the query is optimized to better identify other user intents. This being said, the use of the local business database in the normalizing increases the ability of the system to identify the intended business name and location, by constructing the optimized query.

In other embodiments, other databases can be used to optimize a query specifically for the content of the database being used as a reference during normalization. In a like manner, the probability logic will use inputs to the HMM, based on the type of information that the new intent targets.

In one embodiment, it is possible to allow other modules to manipulate a query before and/or after the local rewriter handles the query. For example, the user query might be spell corrected, then handled by the local rewriter, then handled by a stopword optimizer. Furthermore, the methods and systems may allow for various types of free form input other than a text search box, for example, a speech recognition system that accepts user queries from a phone or car navigation system and outputs free form text which is consumed by the methods and systems of the invention. Also, the embodiments can be configured to allow for various actions taken as a result of query analysis. For example, in addition to rewriting a web search query, it is possible to take other actions such as showing a map or initiating a phone call. In processing the corpus and/or the user query, it may be possible to allow for special handling of business naming and abbreviation conventions such as treating "corp" as a synonym of "corporation".

In still another embodiment it is possible to allow for the possibility of using implicit locality data in addition to explicit locations specified in the query. Examples of implicit local data are user registration data, user's IP address, global positioning readings or proximity to cellular towers for a mobile device, user query history, user click history, or location inferred from a user's social network.

In another embodiment, it is possible to allow for the use of frequency and popularity data associated with dictionaries and business entities. Data may be derived from sources such as individual user or aggregated query frequencies, clicks on web results, interactions with mapping systems, user bookmarks, and user address book entries. The search engine can index special meta-data associated with web pages and web sites, such as zip codes and phone area codes (derived from sources such as the page text and links to/from the web site). The local query rewriter can alter the recall and ranking of web results based on matches to meta-data.

Embodiments can also allow for the possibility for the corpus to be derived from various sources including query logs, web pages, yellow page databases, etc., and the possibility that the data can be "cleaned" and/or annotated by various forms of automated and manual/editorial filtering. These various embodiments and enhancements have been described to illustrate the broad scope of the invention, and how the various illustrated examples should not limit the alternative variations.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for processing user entered query data to improve results of a search of pages using a local search database, when searching the internet, comprising:
   (a) receiving the user entered query data and parsing each word of the query data;
   (b) examining each word to determine if the word is associated with one of an intent name, a city name or a state name, the examining using a probabilistic dictionary to determine a likelihood that the word is one of the intent name, the city name or the state name, and associating the words that were determined to be,
      (i) the intent name with an intent name tag to create one or more tagged intent terms;
      (ii) the city name with a city name tag to create one or more tagged city terms; or
      (iii) the state name with a state name tag to create one or more tagged state terms;
   (c) normalizing each of the tagged intent terms, the tagged city terms and the tagged state terms, the normalizing including boosting information if found in the local search database and determining proximity between selected ones of the tagged intent, city or state terms; and
   (d) generating an optimized internal search query that incorporates constraints and ranking based on at least the boosting information and the determined proximity between the selected tagged intent, city or state terms, the optimized internal search query being applied to the internet to enable search results to be produced and displayed to the user in response to the entered query data, where operations defined by the computer-implemented method are executed by a processor.

2. A computer-implemented method for processing user entered query data as recited in claim 1, wherein the intent name is a descriptive word or words of places, things, or events, which can include business names.

3. A computer-implemented method for processing user entered query data as recited in claim 1, wherein the normalizing is executed on each of the tagged intent terms, then on each of the tagged city terms, then on the tagged state terms, and then on a combination of the tagged city and tagged state terms.

4. A computer-implemented method for processing user entered query data as recited in claim 3, wherein the normalizing of a tagged intent terms includes,
   (i) applying canonicalization rules to the tagged intent terms to convert any tagged intent term that is not in a standard representation to the standard representation;
   (ii) performing a domain lookup in the local search database to boost relevance of documents from preferred domains if found in the local search database; and
   (iii) examining proximity relationships between the tagged intent terms to boost relevance of the tagged intent terms having a determined proximity between the tagged business terms.

5. A computer-implemented method for processing user entered query data as recited in claim 3, wherein the normalizing of the tagged city terms includes,
   (i) applying canonicalization rules to the tagged city terms to convert any tagged city term that is not in a standard representation to the standard representation; and
   (ii) examining proximity relationships between the tagged city terms to boost relevance of the tagged city terms having a determined proximity between the tagged city terms.

6. A computer-implemented method for processing user entered query data as recited in claim 5, wherein the normalizing of the tagged state terms includes,
   applying canonicalization rules to the tagged state terms to convert any tagged state term that is not in a standard representation to the standard representation.

7. A computer-implemented method for processing user entered query data as recited in claim 6, further comprising normalizing a combination of the tagged city and state terms, the normalizing including,
   (i) examining proximity relationships between the tagged city terms and tagged state terms located within a predetermined window;
   (i) applying canonicalization rules to the tagged state terms to convert any tagged state term that is not in a standard representation to the standard representation when the proximity relationship is within the predetermined window.

8. A computer-implemented method for processing user entered query data as recited in claim 1, further comprising, using probabilistic dictionaries and processing by a Hidden Markov Model (HMM).

9. A computer-implemented method for processing user entered query data as recited in claim 8, wherein the HMM is trained with a database of names.

10. A computer-implemented method for processing user entered query data as recited in claim 9, wherein the HMM is trained using popular search query data.

11. A computer-implemented method for processing user entered query data to improve results of a search of pages using a local search database, when searching the internet, comprising:
   (a) receiving the user entered query data and parsing each word of the query data;
   (b) segmenting words using a probabilistic dictionary to determine a likelihood that the word is for a particular name, and associating the particular names with a name tag to create one or more tagged name terms,
   (c) normalizing each of the tagged name terms and the normalizing including boosting information if found in the local search database, determining proximity between selected ones of the tagged name terms; and
   (d) generating an optimized search query that incorporates normalized terms and operators, the optimized search query being applied to the internet to enable search results to be produced and displayed to the user in response to the entered query data, where operations defined by the computer-implemented method are executed by a processor.

12. A computer-implemented method as recited in claim 11, wherein the optimized search query incorporates constraints and ranking based on at least the boosting information and the determined proximity between the selected tagged name terms.

13. A computer-implemented method as recited in claim 11, wherein the normalizing is executed in order on each of the tagged name terms.

14. A computer-implemented method as recited in claim 13, wherein the normalizing of the tagged name terms includes,
   (i) applying canonicalization rules to the tagged name terms to convert any tagged name term that is not in a standard representation to the standard representation;
   (ii) performing a domain lookup in the local search database to boost relevance of documents from preferred domains if found in the local search database; and
   (iii) examining proximity relationships between the tagged name terms to boost relevance of the tagged name terms having a determined proximity between the tagged name terms.

15. A computer-implemented method as recited in claim 13, using probabilistic dictionaries and processing by a Hidden Markov Model (HMM).

16. A computer-implemented method as recited in claim 15, wherein the HMM is trained with a database of intent names.

17. A computer-implemented method as recited in claim 16, wherein the HMM is trained using popular search query data.

18. A system for processing user queries provided to a search engine, comprising:
   (a) a user interface for receiving user queries;
   (b) a search server in communication with the user interface, the search server including,
      (i) processing of probability logic that generates probability dictionaries, the probability logic using a Hidden Markov Model, which is trained with name databases; and
      (ii) processing to implement a term parser, a tag applicator, and a term normalizer, the term parser and the tag applicator being in communication with the probability logic, so as to enable segmentation of the user queries and tagging of the user queries and the term normalizer being in communication with a database, the database being accessed by the term normalizer to canonicalize and boost terms found in the database and analyze proximity between terms of the user query, wherein an optimized search query is constructed and applied to the internet, the optimized search query returning search results to the user interface.

19. A system as recited in claim 18, wherein the HMM is trained with the name databases, including one or more business names, city names, state names, school names, historical site names, event names, business categories, zip codes, country names, region names, informal names, county names, location specified names, area codes, user's implicit locality data, IP address, global positioning data, cellular tower data, query history, social network implied location, or popular search query data.

20. A system as recited in claim 18, wherein the user query is examined to find name information, including one or more of business names, city names, state names, school names, historical site names, event names, business categories, zip codes, country names, region names, informal names, county names, location specified names, area codes, user's implicit locality data, IP address, global positioning data, cellular tower data, query history, social network implied location, popular search query data, web pages, yellow pages, or annotations.

* * * * *